United States Patent
Busaba et al.

(10) Patent No.: US 8,201,067 B2
(45) Date of Patent: Jun. 12, 2012

(54) PROCESSOR ERROR CHECKING FOR INSTRUCTION DATA

(75) Inventors: Fadi Y. Busaba, Poughkeepsie, NY (US); Khary J. Alexander, Poughkeepsie, NY (US); Michael Billeci, Tivoli, NY (US); Bruce C. Giamei, Poughkeepsie, NY (US); Vimal M. Kapadia, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 12/037,038

(22) Filed: Feb. 25, 2008

(65) Prior Publication Data

US 2009/0217077 A1 Aug. 27, 2009

(51) Int. Cl.
  *G06F 11/00* (2006.01)
  *G08C 25/00* (2006.01)
  *H03M 13/00* (2006.01)
  *H04L 1/00* (2006.01)
(52) U.S. Cl. ......... 714/799; 714/800; 714/805; 712/228
(58) Field of Classification Search .................. 714/799, 714/800, 805, 819; 712/228
  See application file for complete search history.

(56) References Cited

U.S. PATENT DOCUMENTS

| | | | |
|---|---|---|---|
| 4,972,314 A | 11/1990 | Getzinger et al. | |
| 5,497,459 A | 3/1996 | Tanihira et al. | |
| 5,612,965 A * | 3/1997 | Michaelson | 714/800 |
| 5,630,082 A | 5/1997 | Yao et al. | |
| 5,708,837 A | 1/1998 | Handlogten | |
| 6,658,621 B1 * | 12/2003 | Jamil et al. | 714/805 |
| 6,725,358 B1 | 4/2004 | Moore | |
| 7,228,404 B1 | 6/2007 | Patel et al. | |
| 7,555,703 B2 * | 6/2009 | Mukherjee et al. | 714/800 |
| 2001/0025338 A1 * | 9/2001 | Zumkehr et al. | 712/228 |
| 2005/0097561 A1 | 5/2005 | Schumacher et al. | |
| 2006/0156177 A1 * | 7/2006 | Kottapalli et al. | 714/758 |
| 2009/0210777 A1 * | 8/2009 | Weiberle et al. | 714/819 |

FOREIGN PATENT DOCUMENTS

JP 5298097 A 11/1993

* cited by examiner

*Primary Examiner* — Sam Rizk
(74) *Attorney, Agent, or Firm* — Cantor Colburn LLP; John Campbell

(57) ABSTRACT

A method for processor error checking including receiving an instruction data, generating a pre-processing parity data based on the instruction data, maintaining the pre-processing parity data, processing the instruction data, generating a post-processing parity data based on the processed instruction data, checking for an error related to processing the instruction data by comparing the post-processing parity data to the pre-processing parity data, and transmitting an error signal that indicates the error related to processing the instruction data occurred if the post-processing parity data does not match the pre-processing parity data, wherein checking for the error related to processing the instruction data is performed without using a duplicate processing circuitry.

18 Claims, 4 Drawing Sheets

PROCESSOR ERROR CHECKING FOR INSTRUCTION DATA

BACKGROUND OF THE INVENTION

This invention relates generally to computer processor operation, and more particularly to providing a method, system, and computer program product for processor error checking.

With the continuing development and use of modern computer systems, the demand has increased for processors that operate without causing data corruption. For example, computers or microprocessors are used in a number of critical functions where consistent, accurate processing is needed, such as life supporting medical devices, financial transaction systems, and automobile safety and control systems. A common approach to meet this demand is to duplicate processor circuitry and compare the resulting duplicate functionality to detect processor errors, such as "circuit failures" (e.g., errors in data-flow) or "random logic errors" (e.g., errors in control logic). However, an increased amount of component space (or area), processing time (e.g., added delay or latency), and power is needed to provide such duplication of processor logic, which can be inefficient for various applications. Thus, an approach to check for such computer processor errors without the use of duplicate circuitry is desirable.

BRIEF SUMMARY OF THE INVENTION

A method, system, and computer program product for processor error checking is provided. An exemplary method embodiment includes receiving an instruction data, generating a pre-processing parity data based on the instruction data, maintaining the pre-processing parity data, processing the instruction data, generating a post-processing parity data based on the processed instruction data, checking for an error related to processing the instruction data by comparing the post-processing parity data to the pre-processing parity data, and transmitting an error signal that indicates the error related to processing the instruction data occurred if the post-processing parity data does not match the pre-processing parity data, wherein checking for the error related to processing the instruction data is performed without using a duplicate processing circuitry.

An exemplary system embodiment includes an input in communication with a first parity generator configured to generate a pre-processing parity data based on an instruction data, an instruction queue pipeline in communication with the first parity generator and configured to maintain the pre-processing parity data and the instruction data, an instruction processing pipeline in communication with the input and configured to process the instruction data, a second parity generator in communication with the instruction processing pipeline and configured to generate a post-processing parity data based on the instruction data after it is processed by the instruction processing pipeline, and a parity data compare unit in communication with the instruction queue pipeline and the second parity generator configured to check for an error related to a processing of the instruction data by the instruction processing pipeline by comparing the post-processing parity data to the pre-processing parity data and transmitting an error signal that indicates the error related to the processing of the instruction data occurred if the post-processing parity data does not match the pre-processing parity data, wherein the system is configured to check for the error related to the processing of the instruction data by the instruction processing pipeline without including a duplicate instruction processing pipeline.

An exemplary computer program product embodiment includes a computer usable medium having a computer readable program, wherein the computer readable program, when executed on a computer, causes the computer to receive an instruction data, generate a pre-processing parity data based on the instruction data, maintain the pre-processing parity data, process the instruction data, generate a post-processing parity data based on the processed instruction data, check for an error related to processing the instruction data by comparing the post-processing parity data to the pre-processing parity data, and transmit an error signal that indicates the error related to processing the instruction data occurred if the post-processing parity data does not match the pre-processing parity data, wherein the check for the error related to processing the instruction data is performed without a duplicate processing circuitry.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments of the invention described herein provide a method, system, and computer program product for processor error checking. In accordance with such exemplary embodiments, processor error checking for reliability availability serviceability ("RAS") is provided without the use of duplicate processing circuitry.

Figure 1:
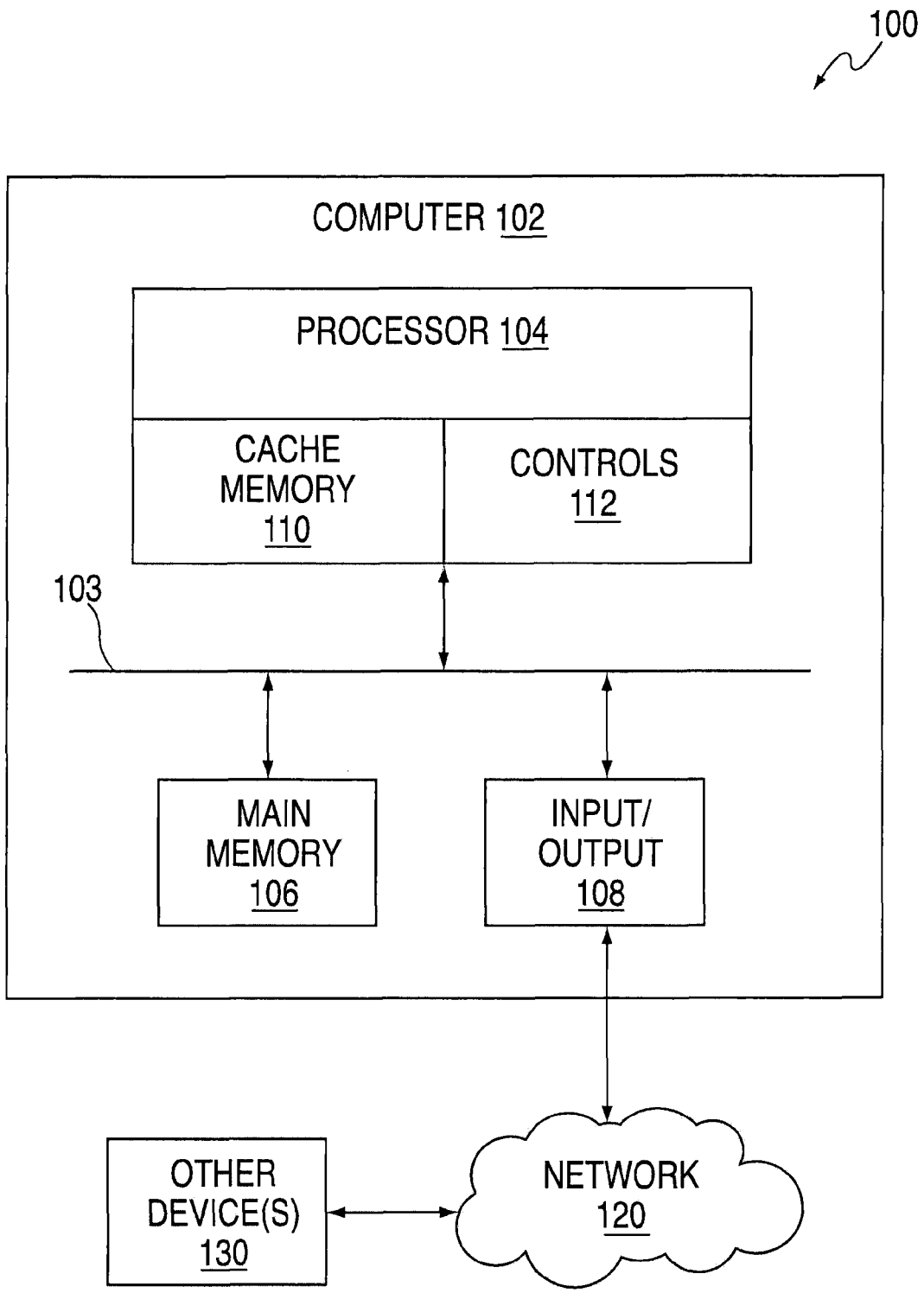
FIG. 1 is a block diagram illustrating an example of a computer system including an exemplary computing device configured for processor error checking.

Turning now to the drawings in greater detail, wherein like reference numerals indicate like elements, FIG. 1 illustrates an example of a computer system 100 including an exemplary computing device ("computer") 102 configured for processor error checking. In addition to computer 302, exemplary computer system 100 includes network 120 and other device(s) 130. Network 120 connects computer 102 and other device(s) 130 and may include one or more wide area networks (WANs) and/or local area networks (LANs) such as the Internet, intranet(s), and/or wireless communication network(s). Other device(s) 130 may include one or more other devices, e.g., one or more other computers, storage devices, peripheral devices, etc. Computer 102 and other device(s) 130 are in communication via network 120, e.g., to communicate data between them.

Exemplary computer 102 includes processor 104, main memory ("memory") 106, and input/output components) 108, which are in communication via bus 103. Processor 104 may include multiple (e.g., two or more) processors, which may implement pipeline processing, and also includes cache memory ("cache") 110, controls 112, and one or more components configured for processor error checking that will be described below. Cache 110 may include multiple cache levels (e.g., L1, L2, etc.) that are on or off-chip from processor 104 (e.g., an L1 cache may be on-chip, an L2 cache may be off-chip, etc.). Memory 106 may include various data stored therein, e.g., instructions, software, routines, etc., which, e.g., may be transferred to/from cache 110 by controls 112 for execution by processor 104. Input/output component(s) 108 may include one or more components, devices, etc. that facilitate local and/or remote input/output operations to/from computer 102, such as a display, keyboard, modem, network adapter, ports, etc. (not depicted).

Figure 2:
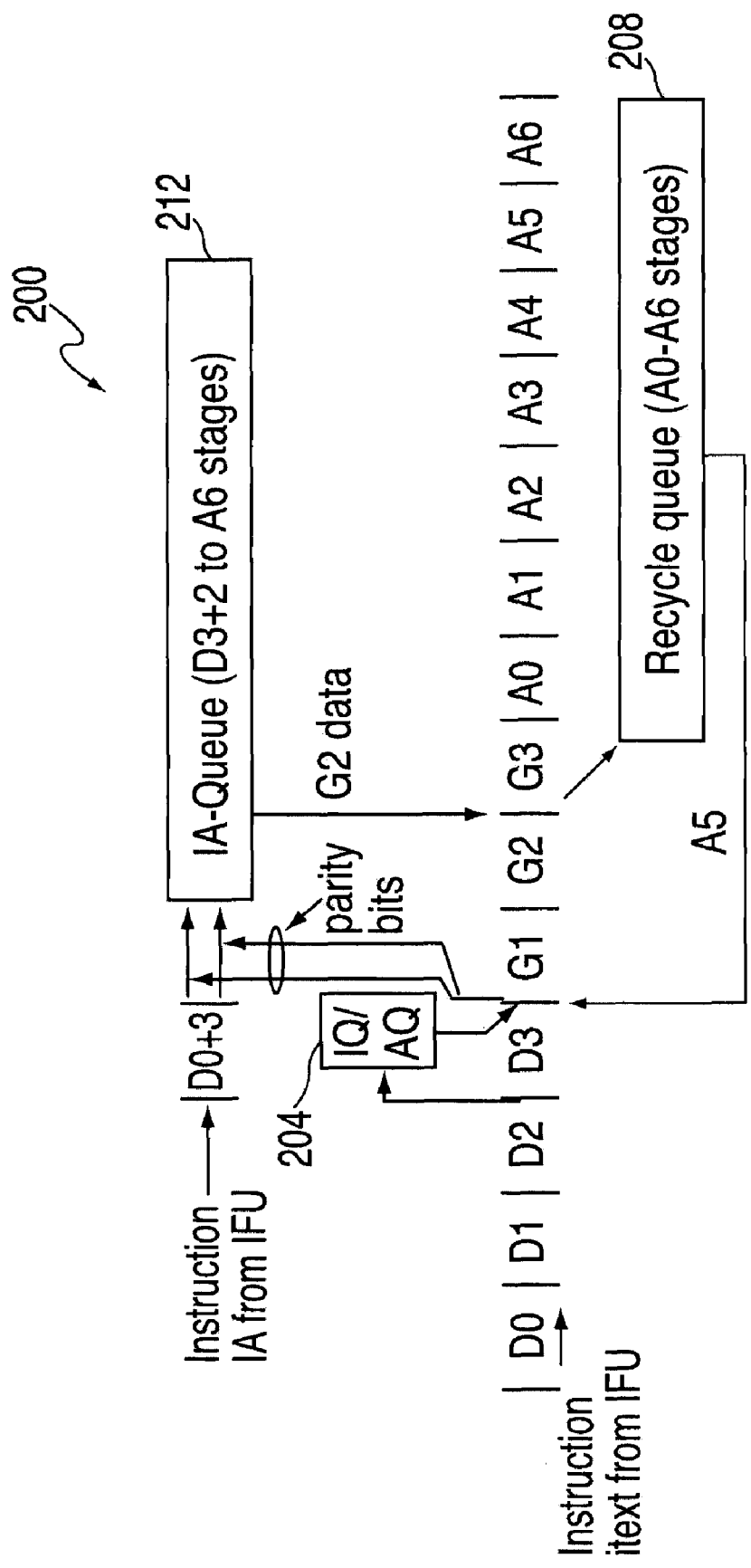
FIG. 2 is a block diagram illustrating an example of a processor pipeline staging of the exemplary computing device of FIG. 1 that is configured for processor error checking.

FIG. 2 illustrates an example of a processor pipeline staging 200 of exemplary computer 102 that is configured for processor error checking. Exemplary pipeline staging 200 may, e.g., be implemented by processor 104. Stage (or cycle) D1 (or D1 stage) and stage D2 are decode stages during which one or more instructions can be decoded in parallel and saved in one or more stage latches or holding tanks ("HT"). Stage D3 is a multiplexing stage during which one or more decoded instructions ("instruction processing data" or "instruction data"; e.g., instruction address data and instruction text data) from HT and from one or more instruction queues and address queues ("IQ/AQ") 204 are multiplexed. IQ/AQ 204 is updated when instruction processing data from HT is delayed from moving to stage G1, e.g., due to one or more stalls in one or more downstream stages. Stage G3 is a dispatch stage during which instruction processing data is sent to execution units such as a fixed point unit ("FXU"). Also, during stage G3, one or more register reads are performed in preparation for forming a memory address.

An address calculation for (e.g., for accessing a data cache memory 110) is performed during stage A0. During stage A1 and stage A2, the cache memory is accessed, and during stage A3, cache data is formatted and routed to the FXU for use during instruction execution. Cache misses are broadcasted during stage A4 and acted upon during stage A5 and stage A6. If an instruction for a fetch operation or store operation misses the cache, the instruction is recycled back from stage A5 into stage G1, A recycle queue 208 (e.g., ten entries deep) is used to sufficiently maintain the Instructions in case they need to be recycled. An instruction address queue ("IAQ") 212 holds one or more instruction addresses ("IA" or "instruction address data") of instructions Successfully decoded (e.g., during stage G3) and maintains the IA until a post recycling point of the instructions (e.g., stage A6). An IA from an instruction fetch unit ("IFU") is sent (e.g., two cycles) after the instruction text ("itext" or "instruction text data") of the instruction. The itext is used (e.g., immediately) in stage D1 for decoding and the IA is used in stage A0 in an address generation adder (not depicted) to calculate information such as a relative branch target address or a relative cache address.

Data in IQ/AQ 204 along with stages G1, G2 and G3 are used for grouping information, address generation interlock/bypass, binary floating point dispatch, general purpose register ("GPR") reads for address generation, etc. Instructions are decoded and stacked in IQ/AQ 204 while there are empty entries if stage G1 is stalled. As instructions are read from IQ/AQ 204 into latches for stage G1, information about potential grouping is collected and sent to one or more controls ("control" or "controls"). During stage G1, grouping bits are examined and a control determines whether the two instructions can be grouped. If the two instructions in the stage G1 latches can be grouped together, both instructions move from stage G1 to stage G2 to stage G3. Alternately, if the instructions cannot be grouped, they are split. For example, the older instruction is moved to stage G2 while the younger instruction is moved from a younger pipe to an older pipe and another instruction fills the slot in the younger pipe.

Figure 3:
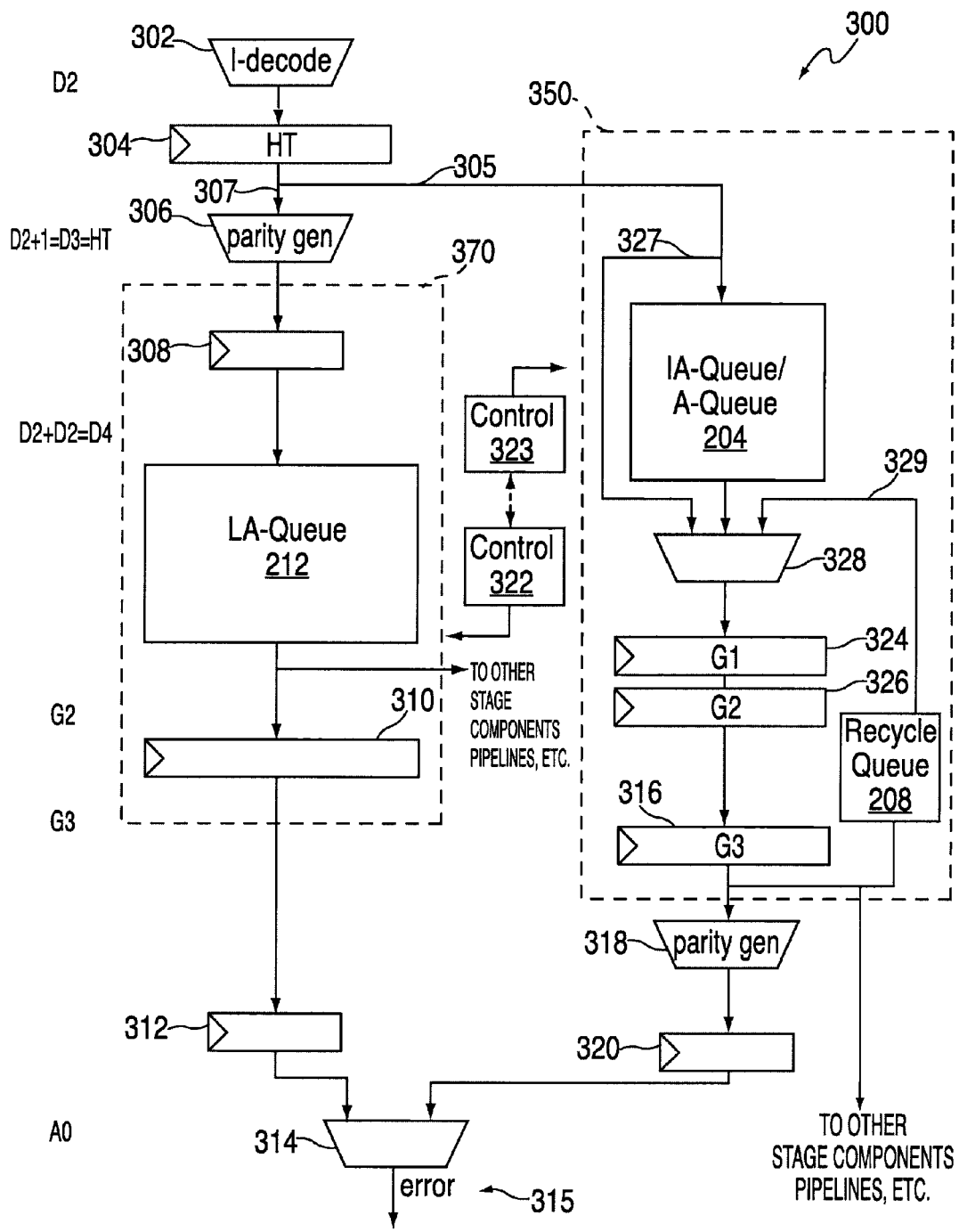
FIG. 3 is a block diagram illustrating an example of a processor pipeline subsystem of the exemplary computing device of FIG. 1 in accordance with the exemplary processor pipeline staging of FIG. 2.

FIG. 3 illustrates an example of a processor pipeline subsystem 300 of exemplary computer 102 in accordance with exemplary processor pipeline staging 200. Exemplary subsystem 300 includes an instruction decoder 302, which can decode one or more instructions into instruction processing data. Decoder 302 is in communication with holding tank (HT) 304, which is a stage latch that can hold a decoded instruction (i.e., instruction processing data), e.g., if one or more downstream components along path 305 are busy or otherwise unavailable, HT 304 is in communication via path 307 with parity generator 306, which can generate one or more parity bits (or "parity data") based on the instruction processing data. Parity generator 306 is in communication with stage latch 308, which is in communication with IAQ 212 (which was described above). IAQ 212 is in communication with stage latch 310, which is in communication with stage latch 312. Stage latch 312 is in communication with parity data compare unit 314, which, e.g., may include logic gate circuitry such as one or more logic-XOR gates.

HT 304 is also in communication with IQ/AQ 204 (which was described above) via path 303. IQ/AQ 204 is in communication with multiplexer 328, which is also in communication with bypass 327 and recycle path 329. Multiplexer 328 is in communication with G1 stage latch 324 (i.e., associated with stage G1), which is in communication with G2 stage latch 326 (i.e., associated with stage G2). G2 stage latch 326 is in communication with G3 stage latch 316, which is in communication with recycle queue 208 and parity generator 318. Recycle queue 208 is also in communication with multiplexer 328 via path 329. Parity generator 318 is in communication with stage latch 320, which is in communication with parity data compare unit 314. The components (e.g., 204, 328, 324, 326, 316, 208) along path 305 between HT 304 and parity generator 318 can be considered an instruction processing pipeline 350, and the components (e.g., 212, 308, 310, 312) can be considered an instruction queue pipeline 370. Control 322 is in communication with and/or control of one or more components of queue pipeline 370 and may also be in communication with and/or control of one or more components of processing pipeline 350. Furthermore, processing pipeline 350 may be controlled by control 323 independently of queue pipeline 370, which is controlled by control 322. Latches 308, 310, 312, 320 324, 326 facilitate the synchronization of processing pipeline 350 and queue pipeline 370. Therefore, alternate configurations, such as additional or fewer latches, may be included in some embodiments accordingly.

Subsystem 300 provides reliability availability serviceability ("RAS") checking in accordance with exemplary embodiments described herein without the use of duplicate processing circuitry for processor error checking. In an exemplary operation, one or more instructions are received at instruction decoder 302 and decoded into instruction processing data. The instruction processing data may be held in HT 304 prior to proceeding along path 305 to processing pipeline 350 (e.g., if one or more components of pipeline 350 are busy or otherwise unavailable). Concurrently, the instruction processing data (e.g., instruction address data) proceeds along path 307 in queue pipeline 370. Along path 307, parity generator 306 generates one or more parity bits ("pre-processing parity data) based on the instruction processing data. The parity bits are maintained (e.g., stored) along with (e.g., asynchronous) instruction processing data (e.g., instruction address data) in IAQ 212 and may be accessed (not depicted)

by pipeline 350 or other pipelines (e.g., during stage G3) for use in address generation (e.g., during stage A0 of relative instruction data). The parity bits for the unprocessed instruction data proceed through queue pipeline 370 to parity data compare unit 314, and the instruction processing data (e.g., instruction address data) and/or the parity bits may also proceed to other components, paths, etc. (not depicted).

Concurrent to the instruction data flow (i.e., instruction address data and instruction parity data) along path 307 and through instruction queue pipeline 370, instruction processing data (e.g., instruction address data and instruction text data) proceeds (e.g., after release from HT 304 if needed) along path 305 to instruction processing pipeline 350. Some of the instruction data may proceed along IQ/AQ bypass path 327 to multiplexer 328, while other instruction data may be held in IQ/AQ 204 (which may, e.g., be six entries deep in some embodiments), e.g., if one or more downstream components of pipeline 350 are busy or otherwise unavailable to process the instruction data (i.e., there are one or more stalls). Recycled instruction data may also proceed to multiplexer 328 via recycle queue path 329. The instruction processing data is appropriately prioritized (e.g., arbitrated) through multiplexer 328 to G1 stage latch 324, onto G2 stage latch 326, and onto G3 stage latch 316, during which processing such as grouping, dispatching, etc. of the instruction data may be performed. After G3 latch 316, some of the instruction data may be recycled by proceeding to recycle queue 208 and back to multiplexer 328 to proceed through stages G1, G2, G3, which recycle flow may occur one or more times. Instruction data may, e.g., be recycled if the instruction data can not proceed to other downstream components, pipelines, etc. (not depicted), e.g., if busy or otherwise unavailable, or if an error is detected in the instruction data.

Instruction processing data proceeds (e.g., directly or after recycling) from stage G3 latch 316 to parity generator 318 where one or more parity bits ("post-processing parity data) are generated based on the processed instruction data. The instruction processing data also proceeds to other stages, components, pipelines, etc. (not depicted) to complete the instruction processing. The processed instruction parity bits proceed to parity data compare unit 314 and are compared to the unprocessed instruction parity bits from queue pipeline 370. If the parity bits from the two pipelines 350, 370 do not match, then an error related to the processing (e.g., staging, queuing, etc.) of the instruction data has occurred and been detected. For example, the error detected by the parity data mismatch may be a data error (e.g., one or more data bit-flips, e.g., per parity group) or a control error (e.g., a lack of synchronization between the controls 322, 323). As a result, an error signal is generated by compare unit 314. For example, parity data compare unit 314 may output a logic-0 signal if no error is detected or a logic-1 signal if an error is detected (or vice versa). As discussed above, compare unit 314 may include logic gate circuitry such as one or more logic-XOR gates. Error output 315 can be communicated, e.g., to an instruction recovery unit (not depicted), which may trigger a block of creating a checkpoint for the completion of the instruction data processing and a recovery of the instruction data for reprocessing to negate the error (i.e., an error recovery operation). For example, a checkpoint and recovery operation may be triggered in which transient updates made as a result of processing the instruction data are discarded and processing is restarted at the most previous checkpoint (i.e., correctly architected) state before the processing error occurred. Instruction processing pipeline 350 and instruction queue pipeline 370 are both normally utilized for processing purposes in computer 102. Therefore, duplicate circuitry is not needed for processor error checking in accordance with the foregoing exemplary operation.

Figure 4:
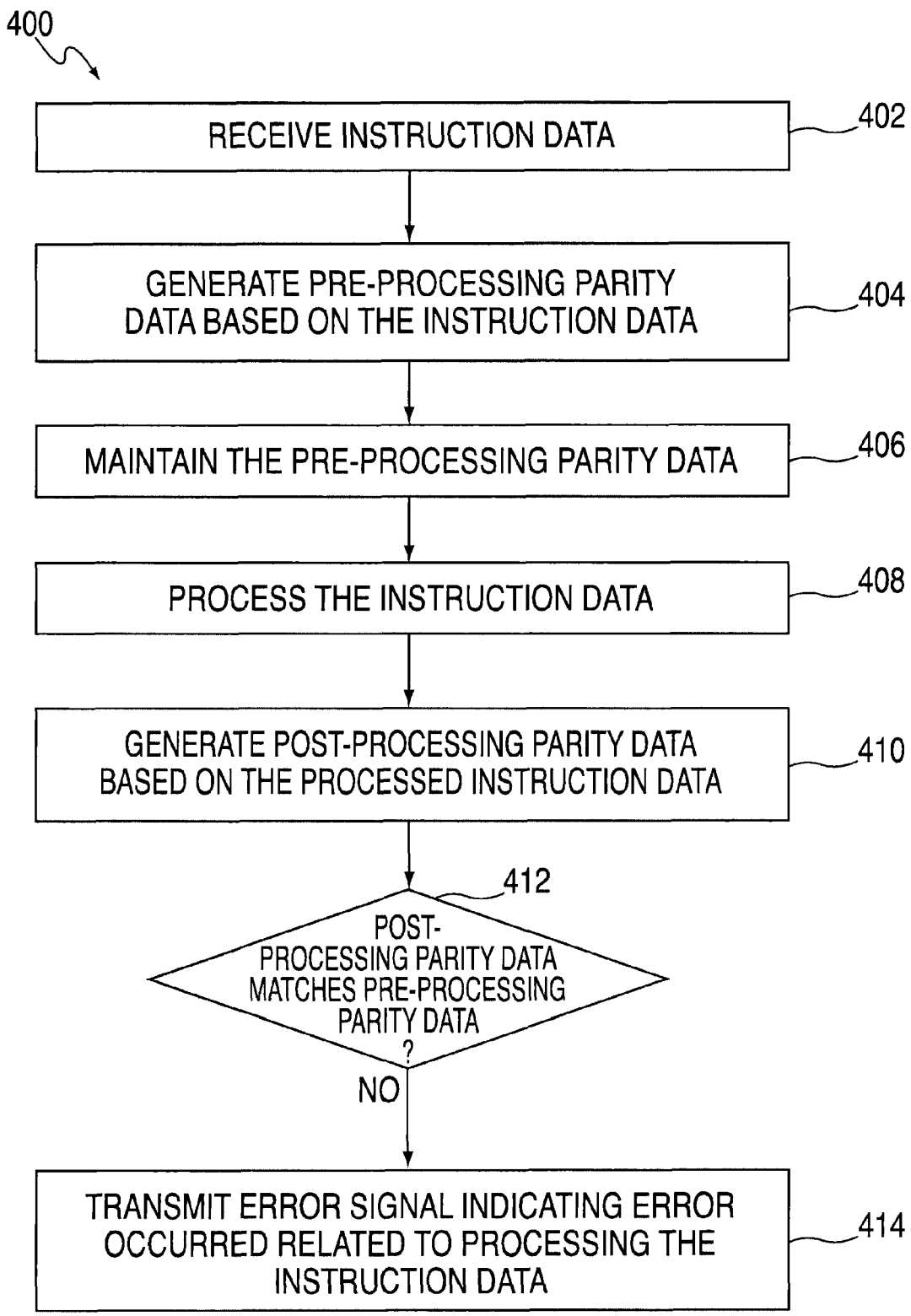
FIG. 4 is a flow diagram illustrating an example of a method for processor error checking executable, e.g., on the exemplary computing device of FIG. 1.

FIG. 4 illustrates an example of a method 400 for processor error checking executable, e.g., on exemplary computer 102. In block 402, instruction processing data is received. For example, a decoded instruction is received (e.g., from instruction decoder 302) that includes Instruction address data and instruction text data. In block 404, pre-processing parity data is generated (e.g., by parity generator 306) based on the instruction data. For example, one or more parity bits are generated. In block 406, the pre-processing parity data is maintained. For example, the pre-processing data is stored in an IAQ of an instruction queue pipeline (e.g., IAQ 212 of queue pipeline 370). In block 408, the instruction data is processed. For example, the instruction processing data flows through an instruction processing pipeline (e.g., processing pipeline 350) during which it is processed.

In block 410, post-processing parity data Is generated (e.g., by parity generator 318) based on the instruction data processed via the instruction processing queue. In block 412, the post processing parity data is compared to the pre-processing parity data. If the parity data matches, in block 414, an error signal is transmitted that indicates that an error occurred related to the processing of the instruction data. Additional variations of method 400 may be performed, e.g., in accordance with the exemplary operation of processor pipeline subsystem 300 described above.

Elements of exemplary computer system 100, exemplary processor pipeline staging 200, and exemplary processor pipeline subsystem 300 are illustrated and described with respect to various components, modules, blocks, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to elements of exemplary computer system 100, exemplary processor pipeline staging 200, and exemplary processor pipeline subsystem 300, execution of the flow diagram blocks may be implemented with respect to other systems, subsystems, etc. that provide the same features, functions, etc. in accordance with exemplary embodiments of the invention.

As described above, embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the Invention has been described with reference to exemplary embodiments, it will be understood by those skilled In the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments felling within the scope of the appended claims. Moreover, the use of the terms first, second, etc. do not denote any order or importance, but rather the terms first, second, etc. are used to distinguish one element from another.

The invention claimed is:

1. A method for processor error checking, the method comprising:
   receiving an instruction data, the instruction data including a decoded instruction;
   generating a pre-processing parity data based on the instruction data;
   maintaining the pre-processing parity data;
   processing the instruction data, the processing comprising passing the instruction data through a multi-stage instruction processing pipeline to produce processed instruction data;
   generating a post-processing parity data based on the processed instruction data;
   checking, by the computer, for an error related to processing the instruction data by comparing the post-processing parity data to the pre-processing parity data; and
   transmitting an error signal that indicates that the error related to processing the instruction data occurred, the transmitting responsive to the post-processing parity data not matching the pre-processing parity data;
   wherein the checking for the error related to processing the instruction data is performed without using a duplicate processing circuitry.

2. The method of claim 1, wherein checking for an error related to processing the instruction data comprises checking for a bit-flip error in the instruction data or for a lack of a synchronization of a controlling of processing the instruction data.

3. The method of claim 1, wherein:
   generating a pre-processing parity data comprises inputting the instruction data to a first parity generator configured to generate a first parity bit based on the instruction data;
   generating a post-processing parity data comprises inputting the processed instruction data to a second parity generator configured to generate a second parity bit based on the processed instruction data; and
   comparing the post-processing parity data to the pre-processing parity data comprises inputting the first parity bit and the second parity bit to a logic gate circuitry configured to output the error signal if the first parity bit does not match the second parity bit.

4. The method of claim 1, wherein:
   maintaining the pre-processing parity data comprises storing the pre-processing parity data in an instruction address queue configured to store an instruction address data.

5. The method of claim 1, wherein receiving an instruction data comprises receiving a decoded instruction from an instruction decoder.

6. The method of claim 1, further comprising, if the post-processing parity data does not match the pre-processing parity data:
   triggering blocking a checkpoint operation for a completion of processing the instruction data; and
   triggering an error recovery operation.

7. A system for processor error checking, comprising:
   an input in communication with a first parity generator configured to generate a pre-processing parity data based on an instruction data, the instruction data including a decoded instruction;
   an instruction queue pipeline in communication with the first parity generator and configured to maintain the pre-processing parity data and the instruction data;
   a multi-stage instruction processing pipeline in communication with the input and configured to process the instruction data;
   a second parity generator in communication with the multi-stage instruction processing pipeline and configured to generate a post-processing parity data based on the instruction data after it is processed by the multi-stage instruction processing pipeline; and
   a parity data compare unit in communication with the instruction queue pipeline and the second parity generator configured to check for an error related to a processing of the instruction data by the multi-stage instruction processing pipeline by comparing the post-processing parity data to the pre-processing parity data and transmitting an error signal that indicates that the error related to the processing of the instruction data occurred, the transmitting responsive to the post-processing parity data not matching the pre-processing parity data;
   wherein the system is configured to check for the error related to the processing of the instruction data by the multi-stage instruction processing pipeline without including a duplicate instruction processing pipeline.

8. The system of claim 7, further comprising:
   a first control in communication with and configured to control the instruction queue pipeline; and
   a second control in communication with and configured to control the multi-stage instruction processing pipeline;
   wherein the parity data compare unit is configured to check for the error related to the processing of the instruction data by checking for a bit-flip error in the instruction data or for a lack of a synchronization between the first control and the second control.

9. The system of claim 7, wherein:
   the pre-processing parity data comprises a first parity bit;
   the post-processing parity data comprises a second parity bit; and
   the parity data compare unit comprises a logic gate circuitry.

10. The system of claim 7, wherein:
    the instruction data comprises an instruction address data and an instruction text data;
    the instruction queue pipeline comprises an instruction address queue configured to store the pre-processing parity data and the instruction address data; and
    the multi-stage instruction processing pipeline comprises:
       an instruction queue in communication with the input and configured to store the instruction text data;
       a second instruction address queue in communication with the input and configured to store the instruction address data;

a plurality of instruction processing stages in communication with the instruction queue and the second instruction address queue and configured to process the instruction text data and the instruction address data; and an instruction recycle queue in communication with the plurality of instruction stages and configured to store instruction data that is recycled for reprocessing by the plurality of instruction stages.

11. The system of claim 7, wherein the instruction data comprises a decoded instruction from an instruction decoder in communication with the input.

12. The system of claim 7, further comprising an instruction recovery unit in communication with the parity data compare unit and configured to:

trigger a blocking of a checkpoint operation for a completion of the processing of the instruction data; and trigger an error recovery operation.

13. A computer program product for processor error checking, the computer program product comprising:

a tangible storage medium readable by a processing circuit and storing instructions for execution by the processing circuit for performing a method comprising:

receiving an instruction data, the instruction data including a decoded instruction;

generating a pre-processing parity data based on the instruction data;

maintaining the pre-processing parity data;

processing the instruction data, the processing comprising passing the instruction data through a multi-stage instruction processing pipeline to produce processed instruction data;

generating a post-processing parity data based on the processed instruction data;

checking, by a computer, for an error related to processing the instruction data by comparing the post-processing parity data to the pre-processing parity data; and transmitting an error signal that indicates that the error related to processing the instruction data occurred, the transmitting responsive to the post-processing parity data not matching the pre-processing parity data;

wherein the checking for the error related to processing the instruction data is performed without a duplicate processing circuitry.

14. The computer program product of claim 13, wherein checking, by a computer, for an error related to processing the instruction data comprises checking for a bit-flip error in the instruction data or for a lack of a synchronization of a controlling of the processing of the instruction data.

15. The computer program product of claim 13, wherein generating a pre-processing parity data comprises inputting the instruction data to a first parity generator configured to generate a first parity bit based on the instruction data;

generating a post-processing parity data comprises inputting the processed instruction data to a second parity generator configured to generate a second parity bit based on the processed instruction data; and comparing the post-processing parity data to the pre-processing parity data comprises inputting the first parity bit and the second parity bit to a logic gate circuitry configured to output the error signal if the first parity bit does not match the second parity bit.

16. The computer program product of claim 13, wherein maintaining the pre-processing parity data comprises storing the pre-processing parity data in an instruction address queue configured to store an instruction address data.

17. The computer program product of claim 13, wherein receiving an instruction data comprises receiving a decoded instruction from an instruction decoder.

18. The computer program product of claim 16, wherein the method further comprises, responsive to the post-processing parity data not matching the pre-processing parity data:

triggering a blocking of a checkpoint operation for a completion of processing the instruction data; and triggering an error recovery operation.

\* \* \* \* \*